(No Model.) 2 Sheets—Sheet 1.
F. HUMPHREVILLE.
INCUBATOR.
No. 296,413. Patented Apr. 8, 1884.
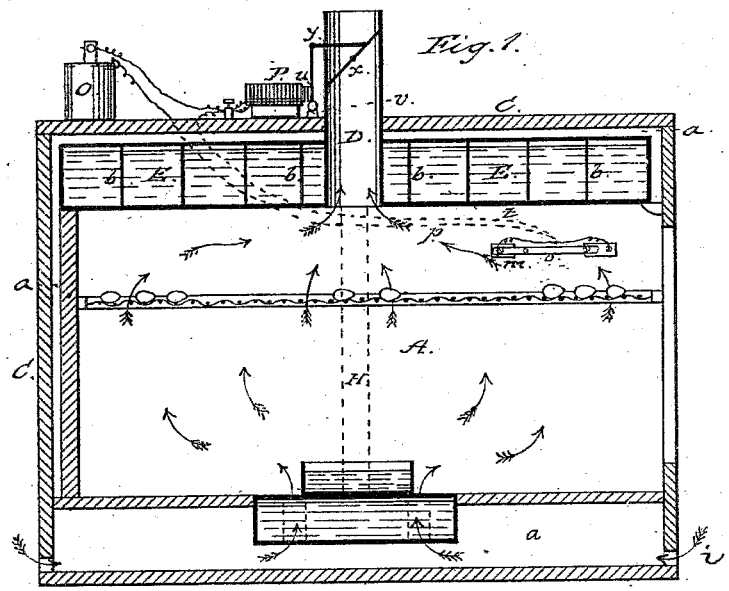
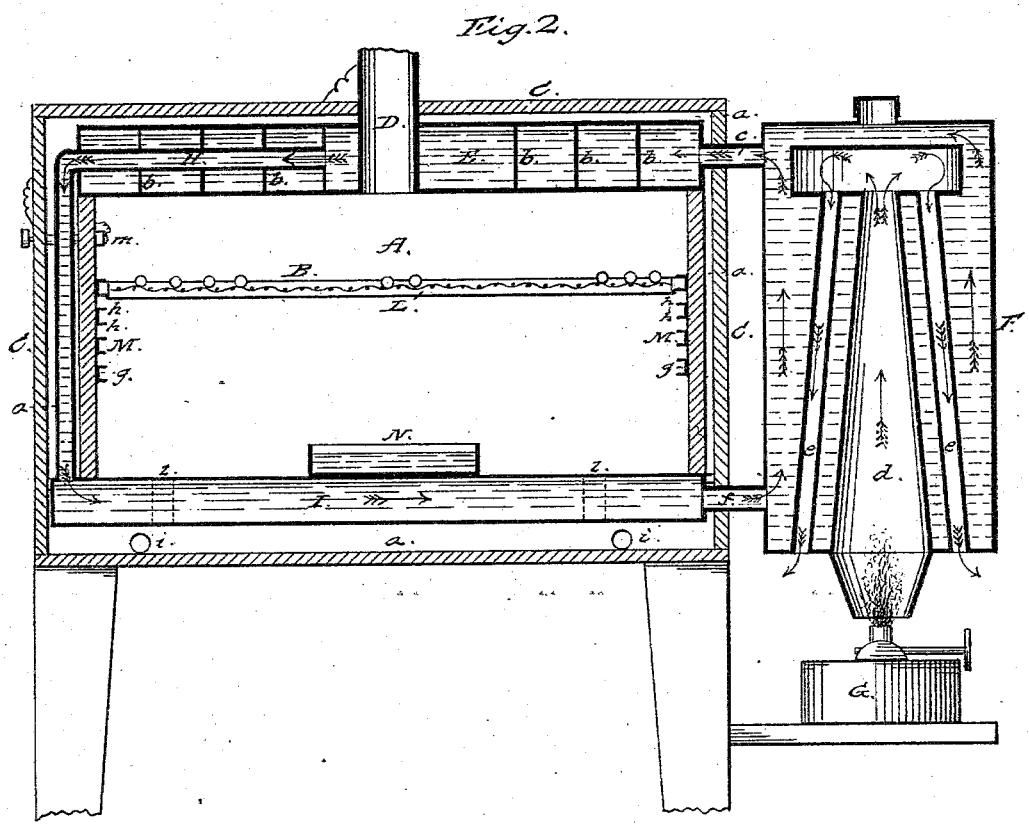
Attest:
F. W. Howard
J. H. Blackwood
Inventor:
Frank Humphreville
N. PETERS, Photo-Lithographer, Washington, D. C.

(No Model.)
F. HUMPHREVILLE.
INCUBATOR.
No. 296,413. Patented Apr. 8, 1884.
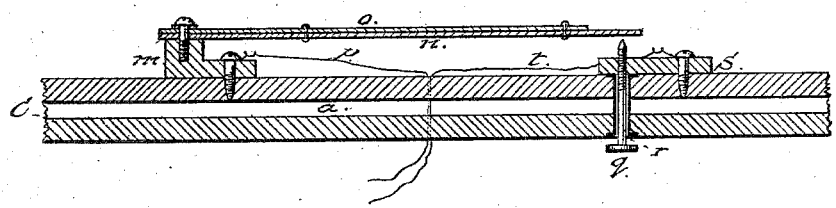
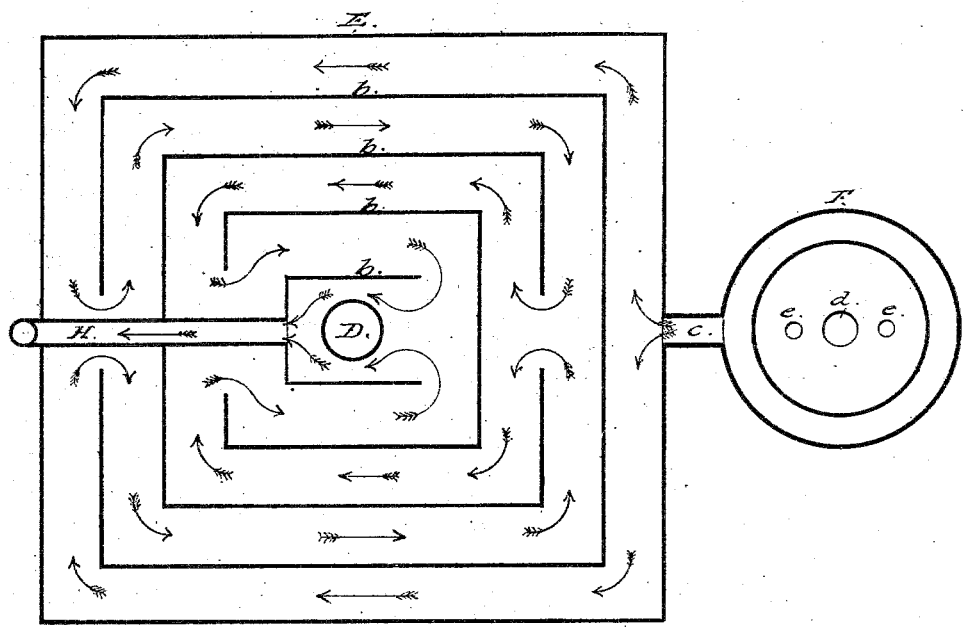
Attest:
F. W. Howard
J. H. Blackwood
Inventor:
Frank Humphreville

UNITED STATES PATENT OFFICE.

FRANK HUMPHREVILLE, OF LANCASTER, PENNSYLVANIA.

INCUBATOR.

SPECIFICATION forming part of Letters Patent No. 296,413, dated April 8, 1884.

Application filed May 11, 1883. (No model.)

*To all whom it may concern:*

Be it known that I, FRANK HUMPHREVILLE, a citizen of the United States, residing at Lancaster, in the county of Lancaster and State of Pennsylvania, have invented certain new and useful Improvements in Incubators; and I do hereby declare the following to be a full, clear, and exact description of the invention, such as will enable others skilled in the art to which it appertains to make and use the same.

My improvements relate to incubators for hatching chickens; and it consists in means for heating the incubator, means for ventilation, and in the guides or ways for holding the egg-trays.

In the accompanying drawings, which illustrate my invention and make part of this specification, Figure 1 is a central vertical section from front to back of my improved incubator. Fig. 2 is a central vertical section from side to side of the same. Fig. 3 is a central longitudinal section of the temperature-regulator; and Fig. 4 is a plan view of the upper tank and boiler.

Like letters designate corresponding parts in all the figures.

I use hot water for heating the chamber A, in which the trays B B, holding the eggs, are placed. The sides, back, and bottom, C C, of the chamber A are double, inclosing a dead-air space, $a$, for retaining the heat as much as possible. The door in front, through which access to the interior is had, is also double. The entire top of the chamber, with the exception of a passage for the flue D, is covered by a water-tank, E, which is inclosed in the outer casing of the chamber A. This tank E is divided by partitions $b\ b$ into various compartments, as shown in Fig. 4, to assist in the circulation of the water. The tank E communicates directly by a pipe, $c$, with the boiler F. The water in the boiler is heated from the heating source G, which is preferably a lamp or gas-flame, as such a heating source gives a very uniform degree of heat with but little attention. The heat from the lamp G passes upward through a central flue, $d$, in the boiler and down through the side flues, $e\ e$, thus utilizing a large proportion of the heat. The water, having circulated through all the compartments of the upper tank, E, passes through a pipe, H, down to a tank, I, at the bottom of the chamber A, from whence it passes through a pipe, $f$, back to the boiler F. Thus a rapid and thorough circulation of the water is insured, and but little attention is required to keep the apparatus in working order.

The trays B B, on which the eggs are placed, have their bottom L composed of fine wire or gauze, so that the air within the chamber A may circulate without hinderance around the eggs and throughout the chamber. For holding the trays in position, I use guides or ways M M, which are formed, preferably, of metal, and are made with one vertical side, $g$, which is fastened to the side of the chamber, and two horizontal inwardly-projecting arms, $h\ h$, between which the trays slide. The ways M M are placed at a distance apart equal to the space between the arms $h\ h$, so that the trays may be placed on either of the arms and raised and lowered as desired. At the bottom of the chamber is placed an open pan, N, in which water is kept for giving the air in the chamber a proper amount of moisture. Ventilating-openings $i\ i$ admit fresh air into the air-space $a$ underneath the chamber, from whence it can pass into the chamber by flues $l\ l$, extending through the tank I.

It is very necessary that the temperature of the incubating-chamber, in which the eggs are placed, shall be maintained at a uniform and unvarying degree, a variation of even a few degrees being dangerous and liable to cause the loss of many eggs. I have shown in the drawings a device whereby the temperature may be kept uniform, a variation of a single degree, or even less, being sufficient to put the device into operation.

In the interior of the chamber A a metal bracket, $m$, is secured, to which is fastened at one end a thin strip, $n$, of brass or other metal. To the top of this metallic strip is firmly secured a strip, $o$, of india-rubber or other suitable material, whose coefficient of expansion is much greater than that of the metallic strip $n$, the ratio of the coefficients of expansion of the strips $n$ and $o$ determining the facility with which the device operates. From the metallic bracket $m$ a wire, $p$, extends to one of the poles of an electric battery, O, which, for convenience, may be placed on the top of the chamber A. A thumb-screw, $q$, extends through an opening, $r$, in the sides of the chamber into and through a metallic plate, S, attached to the inner side of the chamber and covering the opening $r$. From the metallic plate a wire, $t$, extends around a magnet, P, and thence to the other pole of the battery O. The armature $u$ of the magnet is pivoted to brackets $v$ on the top of the chamber, and an arm, $n$, attached to the armature, is connected to a damper, $x$, in the flue D by a lever, $y$. The thumb-screw $q$ being properly adjusted so as to be out of contact with the free end of the strip $n$ when the temperature of the chamber is at its normal degree, when the temperture in the chamber rises slightly the strip $o$, expanding more rapidly than the strip $n$, being attached rigidly thereto, curves the strip $n$ inward until it touches the thumb-screw $q$, closing the circuit, which passes from the battery O through $p\ m\ n\ q\ s\ t$ P back to the battery, magnetizing the magnet P, which attracts the armature $u$, which, through arm $w$ and lever $y$, opens the damper $x$, thus permitting the air to circulate freely through the chamber. This free circulation of the air soon reduces the temperature to its normal degree, so that the strip $o$ contracts, bringing the strip $n$ back to its normal position out of contact with the thumb-screw $q$, thus breaking the circuit, and the armature being no longer attracted by the magnet, the damper falls back of its own weight, closing the flue. As the thumb-screw $q$ can be so adjusted as to close the circuit at a very slight increase of temperature, besides keeping the temperature at a uniform degree, a frequent circulation of air is obtained, fresh air being admitted through the ventilating-openings $i\ i$, and the confined air passing out through the flue D and carrying off any unwholesome odor which may arise from the eggs.

I do not herein claim the thermostat which I have described and shown, as I am about to embody it in a separate application; but What I do claim is—

1. In an incubator, the upper tank divided into compartments, the lower tank, the boiler with central and side flues, and connecting-pipes, in combination with the heating source, substantially as and for the purpose herein specified.

2. The combination, with the egg-trays having wire bottoms, of guides or ways formed with two horizontal arms, the distance between the said arms being equal to the distance between the upper arm of one guide and the lower arm of the guide next above, as and for the purpose set forth.

3. The combination, in an incubator provided with ventilating-openings $i\ i$, leading into the air-space $a$, of the tank I, provided with flues, as passages $l\ l$, leading from said air-space to the egg-chamber, whereby only warm air is introduced into said egg-chamber, substantially as and for the purpose set forth.

In testimony whereof I affix my signature in presence of two witnesses.

FRANK HUMPHREVILLE.

Witnesses:
CHAS. E. WENTZ,
ADA F. WENTZ.